US010122102B1

(12) United States Patent
Garduno et al.

(10) Patent No.: US 10,122,102 B1
(45) Date of Patent: Nov. 6, 2018

(54) X-RAY BATTERY ADAPTER SYSTEM

(71) Applicant: Los Alamos National Security, LLC, Los Alamos, NM (US)

(72) Inventors: Gilbert John Garduno, Los Alamos, NM (US); Orlando Thomas Lopez, Los Alamos, NM (US); Kyle Matthew Sternberg, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 29 days.

(21) Appl. No.: 15/478,369

(22) Filed: Apr. 4, 2017

Related U.S. Application Data

(60) Provisional application No. 62/367,731, filed on Jul. 28, 2016.

(51) Int. Cl.
*H01R 25/00* (2006.01)
*H01R 11/28* (2006.01)
*H01R 13/66* (2006.01)
*H01R 24/54* (2011.01)

(52) U.S. Cl.
CPC ....... *H01R 11/281* (2013.01); *H01R 13/6666* (2013.01); *H01R 13/6691* (2013.01); *H01R 24/54* (2013.01)

(58) Field of Classification Search
CPC ...................................... H01R 24/54
See application file for complete search history.

(56) References Cited

U.S. PATENT DOCUMENTS

| 5,076,805 | A  | * | 12/1991 | Welch  | B25F 5/02 310/50 |
| 7,121,358 | B2 | * | 10/2006 | Gass   | B23B 31/123 173/2 |
| 7,192,294 | B2 | * | 3/2007  | Chen   | H01R 27/00 320/112 |
| 7,972,160 | B2 | * | 7/2011  | Jeong  | H01R 31/06 439/304 |
| 2003/0197485 | A1 | * | 10/2003 | Miller | H02J 7/0027 320/112 |
| 2007/0126290 | A1 | * | 6/2007  | Jaynes | H02J 7/0044 307/150 |
| 2014/0117922 | A1 | * | 5/2014  | Pham   | H02J 7/0027 320/103 |
| 2014/0239895 | A1 | * | 8/2014  | Arendell | H01M 2/1005 320/112 |
| 2015/0086186 | A1 | * | 3/2015  | Boki   | A61M 15/06 392/387 |
| 2016/0213066 | A1 | * | 7/2016  | Zitzke | A24F 47/008 |

* cited by examiner

*Primary Examiner* — Tho D Ta
(74) *Attorney, Agent, or Firm* — LeonardPatel PC; Michael Aristo Leonard, II; Sheetal Suresh Patel

(57) ABSTRACT

An x-ray battery adapter system may include an x-ray battery adapter and a geometry adapter. The x-ray battery adapter may include a circuit board, a baseplate, a heat sink, a cover, and a battery input. The baseplate may include a connector that connects to an x-ray generating device. The geometry adapter may include a cable, a battery receptacle configured to house a battery, and a voltage sensor and battery connector block assembly. The x-ray battery adapter may allow a user of an x-ray generating device to utilize different power sources.

15 Claims, 20 Drawing Sheets

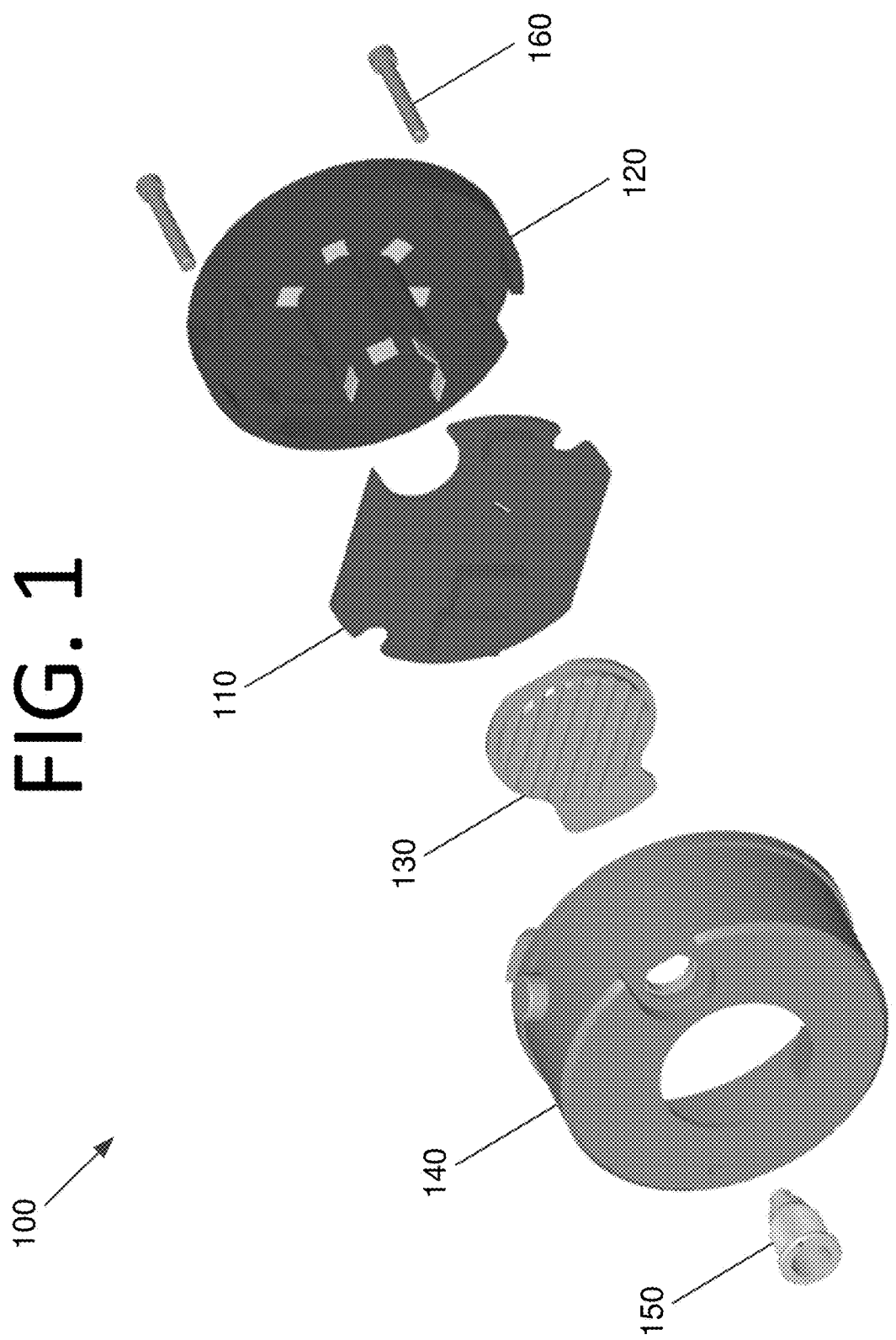

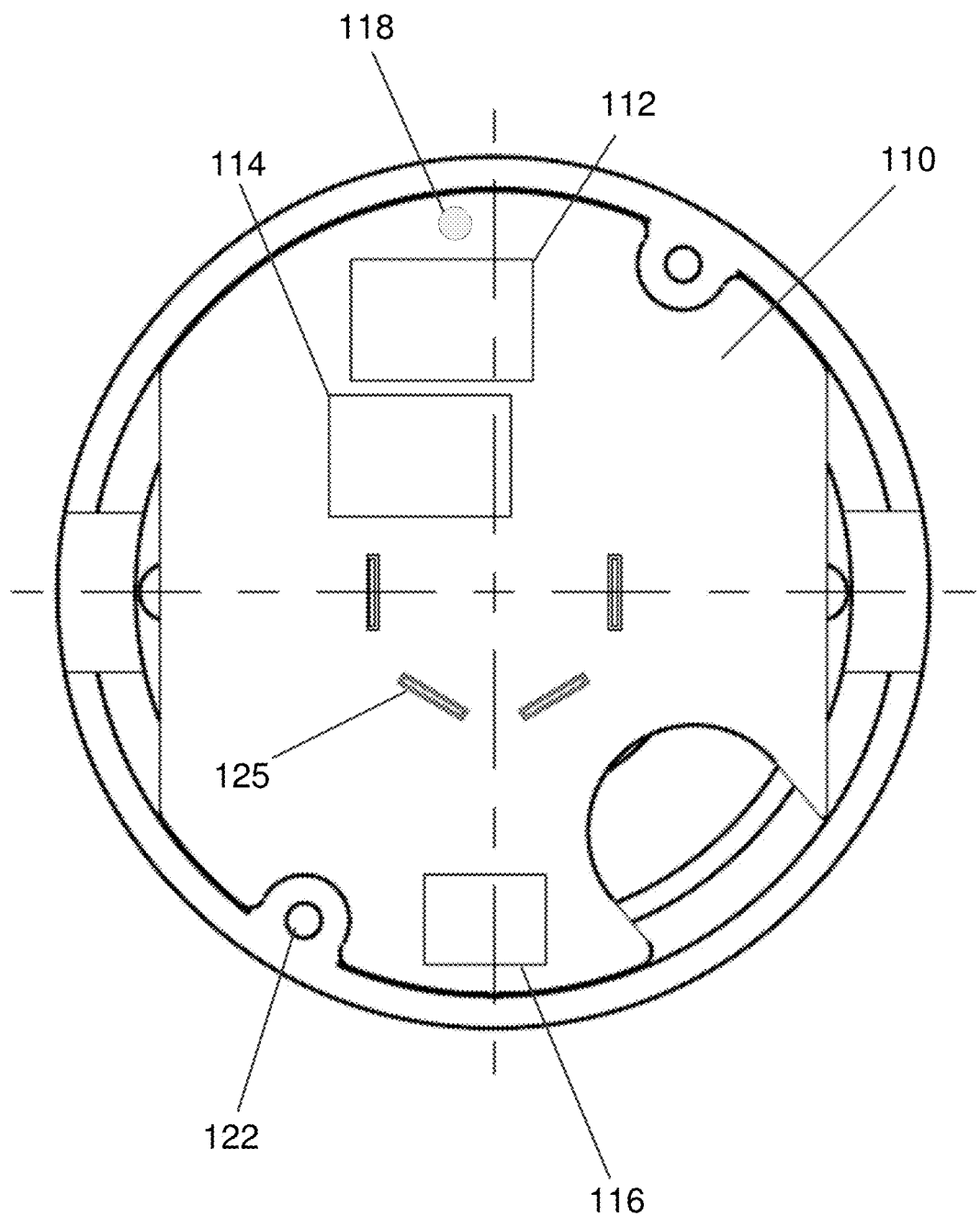

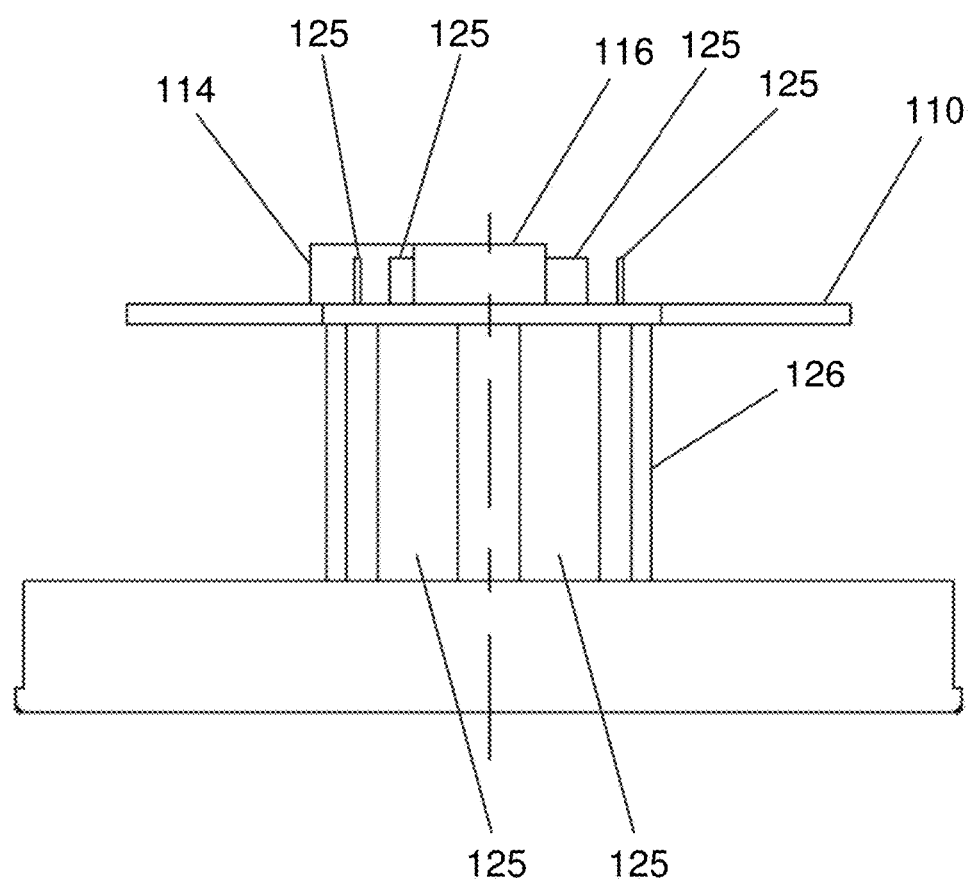

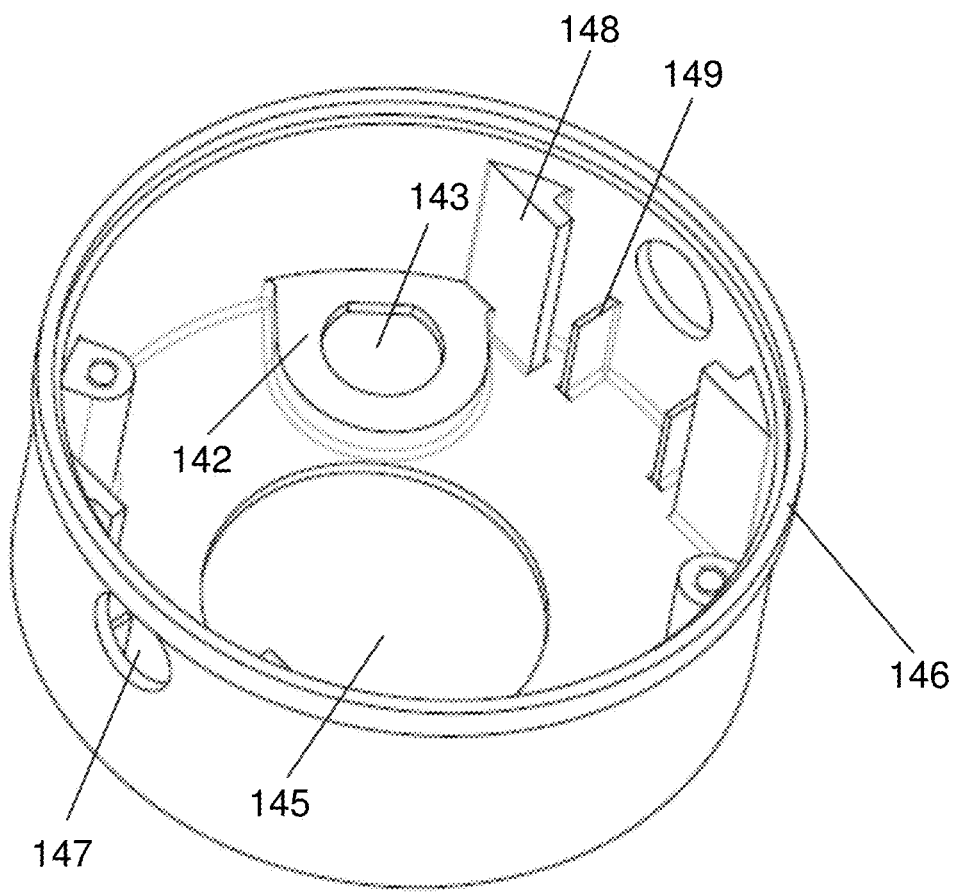

180

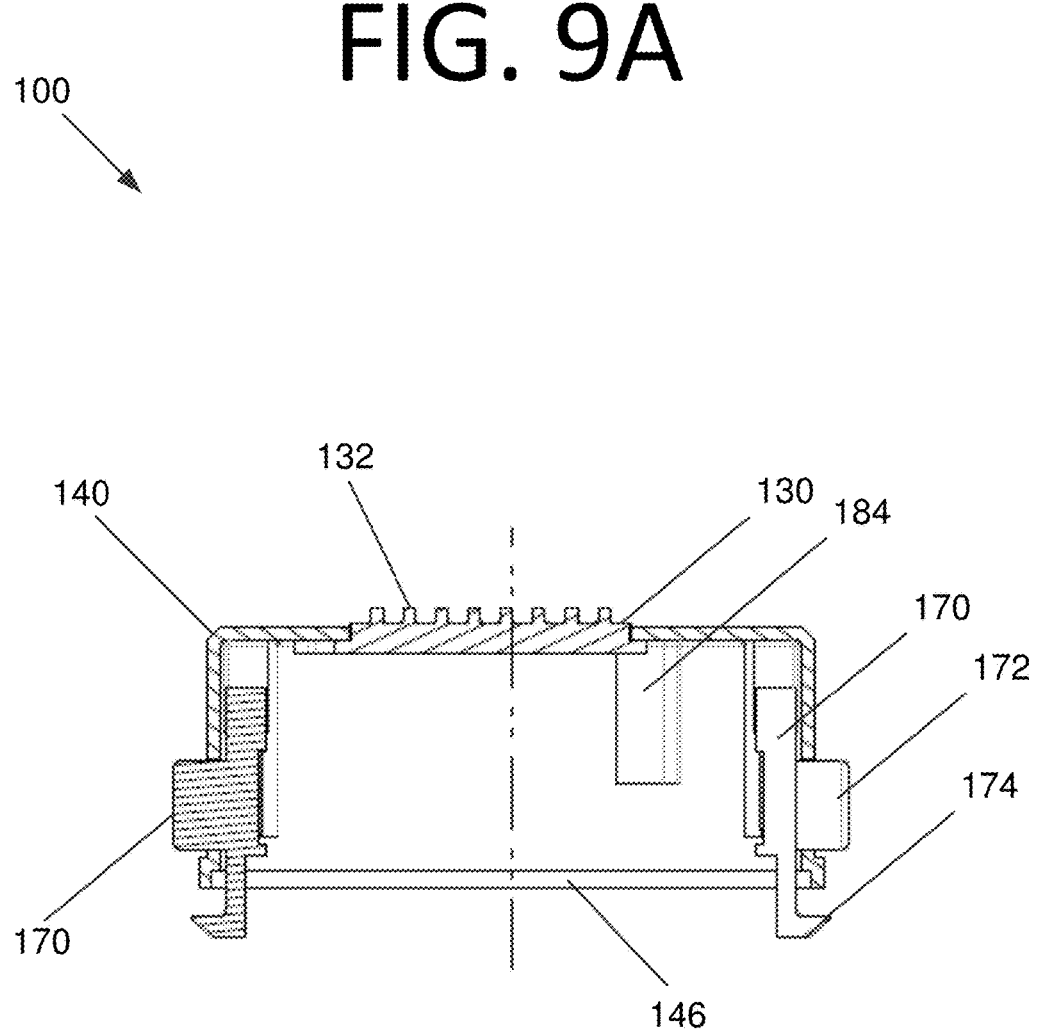

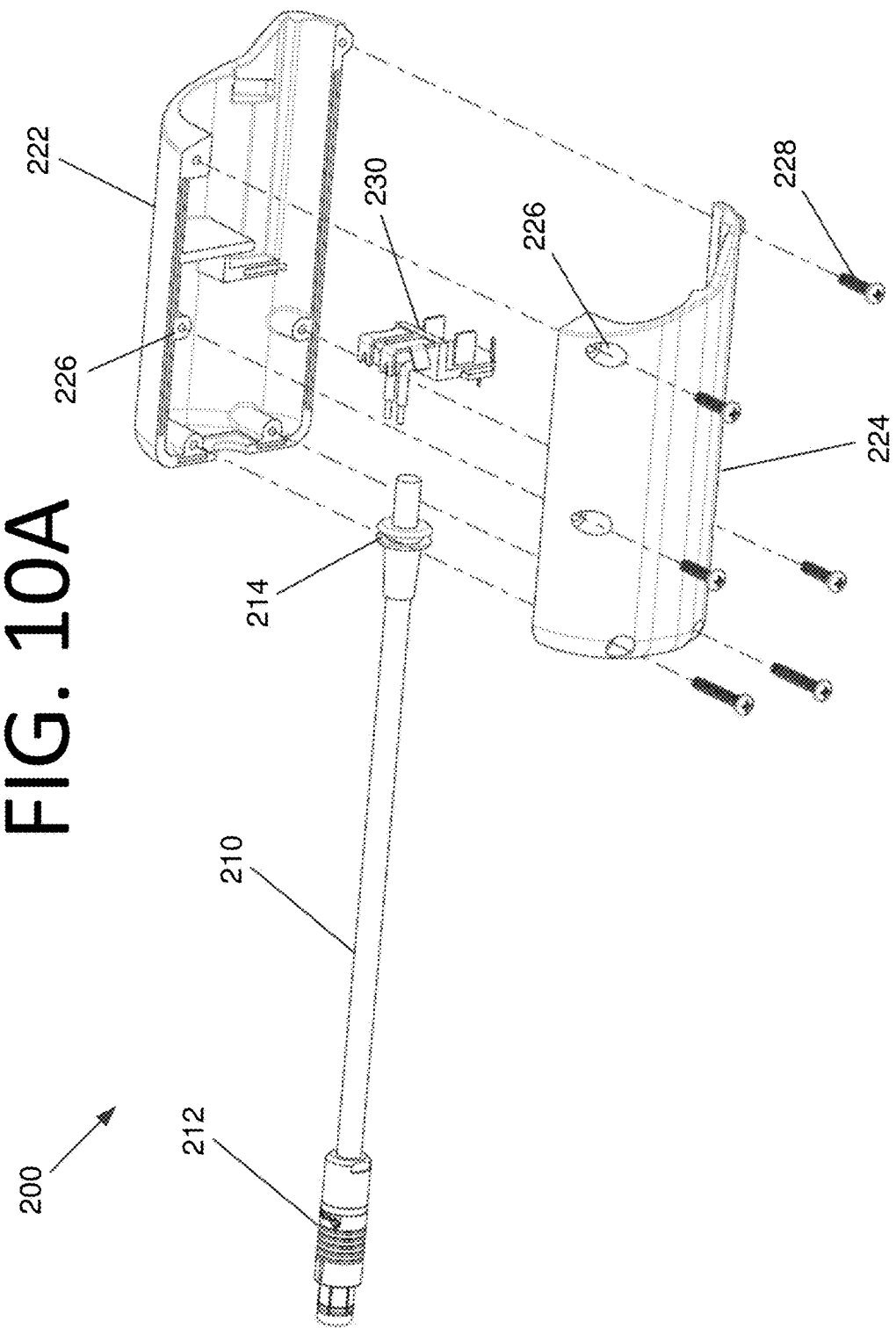

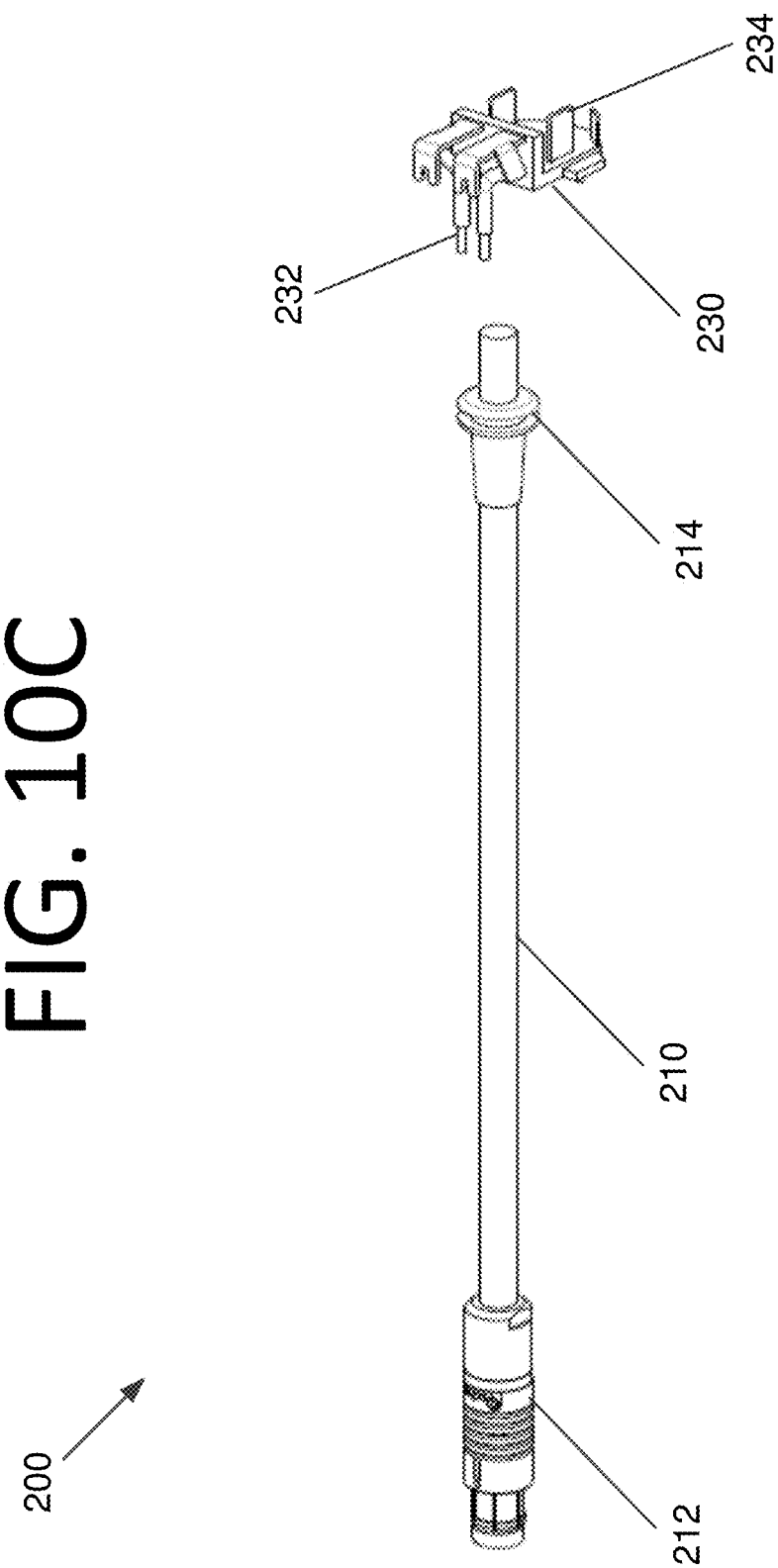

X-RAY BATTERY ADAPTER SYSTEM

CROSS REFERENCE TO RELATED APPLICATION

This application claims the benefit of U.S. Provisional Patent Application No. 62/367,731 filed Jul. 28, 2016. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to adapters, and more particularly, to x-ray battery adapters that allow end users to utilize multiple battery power options when using an x-ray generating device.

BACKGROUND

For conventional x-ray generating devices, only one power source can be used. In order to utilize different power sources, the x-ray generating device would need to be modified. Accordingly, an improved solution for powering x-ray generating devices may be beneficial.

SUMMARY

Certain embodiments of the present invention may provide solutions to the problems and needs in the art that have not yet been fully identified, appreciated, or solved by conventional adapters. For example, some embodiments of the present invention pertain to an x-ray battery adapter that allows a user of an x-ray generating device to utilize different power sources. For instance, in some embodiments, various Direct Current (DC) power sources from 12-40 volts (V) may be used.

In an embodiment, an x-ray battery adapter system includes an x-ray battery adapter and a geometry adapter.

In another embodiment, an x-ray battery adapter includes a circuit board, a baseplate, a heat sink, a cover, and a battery input. The baseplate includes a connector that connects to an x-ray generating device.

In yet another embodiment, a geometry adapter includes a cable, a battery receptacle configured to house a battery, and a voltage sensor and battery connector block assembly.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is an exploded perspective view illustrating an x-ray battery adapter, according to an embodiment of the present invention.

FIG. 3B is a top view illustrating the baseplate assembly of the x-ray battery adapter, according to an embodiment of the present invention.

FIG. 3C is a side view illustrating the baseplate assembly of the x-ray battery adapter, according to an embodiment of the present invention.

FIG. 5B is a bottom perspective view illustrating the cover, according to an embodiment of the present invention.

FIG. 9A is side a cutaway view perpendicular to the release clips illustrating a cover assembly of the x-ray battery adapter, according to an embodiment of the present invention.

FIG. 10A is a perspective exploded view illustrating a geometry adapter, according to an embodiment of the present invention.

FIG. 10C is a side perspective view illustrating a cable and a connector block of the geometry adapter, according to an embodiment of the present invention.

DETAILED DESCRIPTION OF THE EMBODIMENTS

Figure 2A:
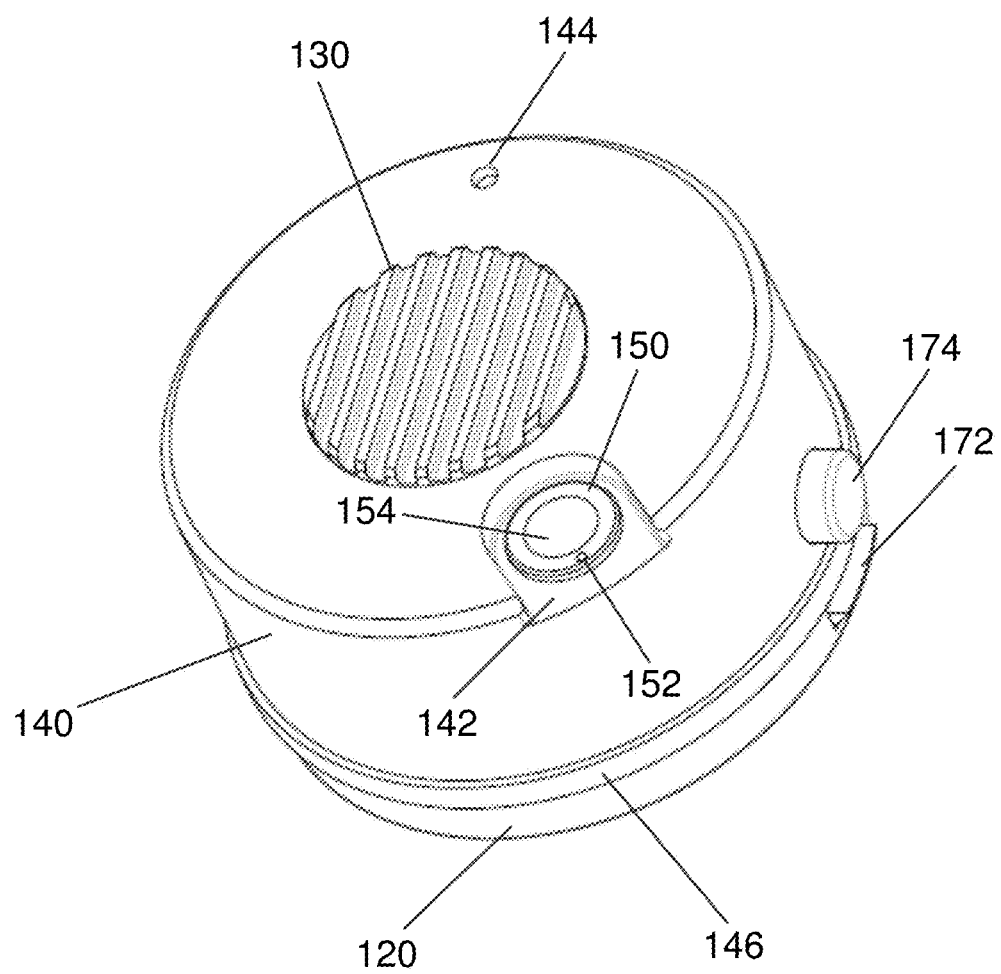
FIG. 2A is a perspective view illustrating the assembled x-ray battery adapter, according to an embodiment of the present invention.

Some embodiments of the present invention pertain to an x-ray battery adapter that allows a user of an x-ray generating device to utilize different power sources. For instance, the adapter in accordance with some embodiments is a mechanical and electrical assembly designed with these features in mind. Such embodiments may provide this capability and the versatility of using multiple power sources. Also, some embodiments may provide the end user with options in emergency situations where the voltage source supplied by the original manufacturer of the x-ray generating device falls short.

Some embodiments, may provide power to x-ray generating devices using commercially available batteries and generic voltage sources. For instance, in some embodiments, DC sources from 12-40V may be used. However, other voltage ranges may be accommodated without deviating from the scope of the invention. Some embodiments can also be connected to 12V and 24V car batteries.

The x-ray battery adapter of some embodiments includes two features to prevent damage to the battery or to the adapter itself. The first is a battery saver feature that prevents lithium batteries, for example, from over-draining. When lithium batteries are over-drained, they have a chance to catch fire, and possibly explode. To prevent this, the adapter of some embodiments shuts down to prevent damage. This shutdown may indicate that the battery is empty and requires charging. There is no "battery low" indicator in some embodiments.

The second feature of some embodiments is an over-temperature indicator. When lit, the battery adapter is nearing a critical failure due to temperature. The adapter will not shut down due to over-temperature in some embodiments. Rather, it is up to the user to decide if continued operation is necessary. If continued operation is not desired, power may be disconnected and the adapter may be allowed to rest until it is cool to the touch.

The adapter of some embodiments has the ability to be powered from any DC supply from 12V to 40V without an associated geometry adapter. To utilize this feature, the user may use a banana jack adapter and clips or modify an existing geometry adapter. By design, powering the x-ray battery adapter using a banana jack adapter is simple and intuitive. The connector may be plugged into the x-ray battery adapter and the clips may be attached to an auxiliary power supply. Multiple sizes of clips may be provided for versatility.

To modify the existing geometry adapter, the user may simply cut off the cable with the connector. A plastic geometry adapter can be discarded or returned for repair in some embodiments. The user should then remove the cable jacket and expose the conductors, e.g. a black, white, and green conducting wire. The black conductor may be connected to ground of the new DC source, and the white and green conductors may both be connected to a positive source. Once the connections are made, the new cable may be plugged into the x-ray battery adapter and the adapter may be connected to the x-ray generating device. The x-ray generating device is now ready for operation.

The x-ray battery adapter in some embodiments includes a reverse battery protection circuit to prevent damage if the conductors (e.g., black and white conductors) are connected backwards, for example. The adapter may simply not turn on and the x-ray generating device will not operate. To fix this problem, the user merely needs to swap the conductors.

The x-ray battery adapter in some embodiments includes an anti-spark circuit to prevent the contacts from sparking when a battery is attached. This circuit may be transparent to the user and emit an audible "click" from the adapter. This is normal operation in some embodiments. If the "click" is not heard and the x-ray generating device does not turn on, the adapter may not be receiving power or the reverse battery protection circuit may be active.

FIG. 1 is an exploded perspective view illustrating an x-ray battery adapter 100, according to an embodiment of the present invention. X-ray battery adapter 100 includes a circuit board 110, a baseplate 120, a heat sink 130, a cover 140, a battery input 150, and screws 160 that connect cover 140 to baseplate 120 and secure the components of x-ray battery adapter 100. When assembled, battery input 150 connects to the desired battery (not shown).

Figure 2B:
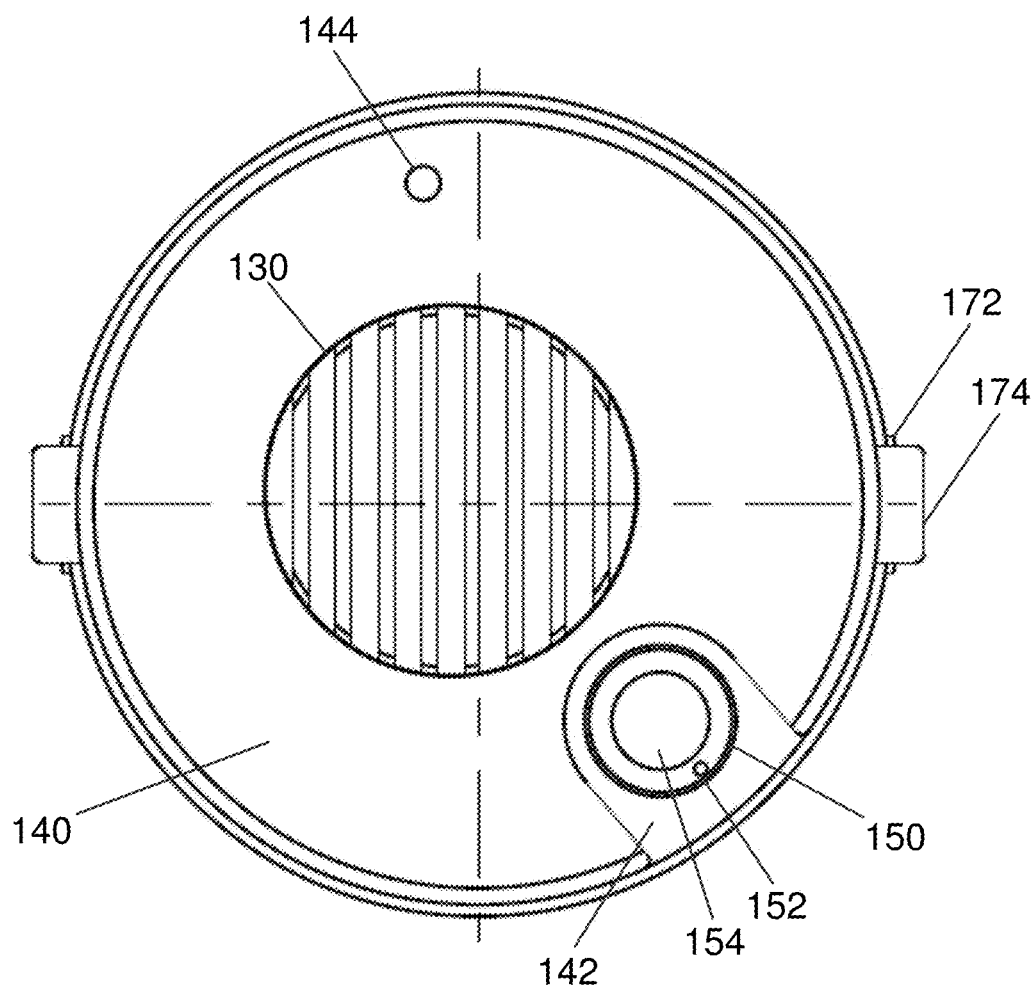
FIG. 2B is a top view illustrating the assembled x-ray battery adapter, according to an embodiment of the present invention.
Figure 2C:
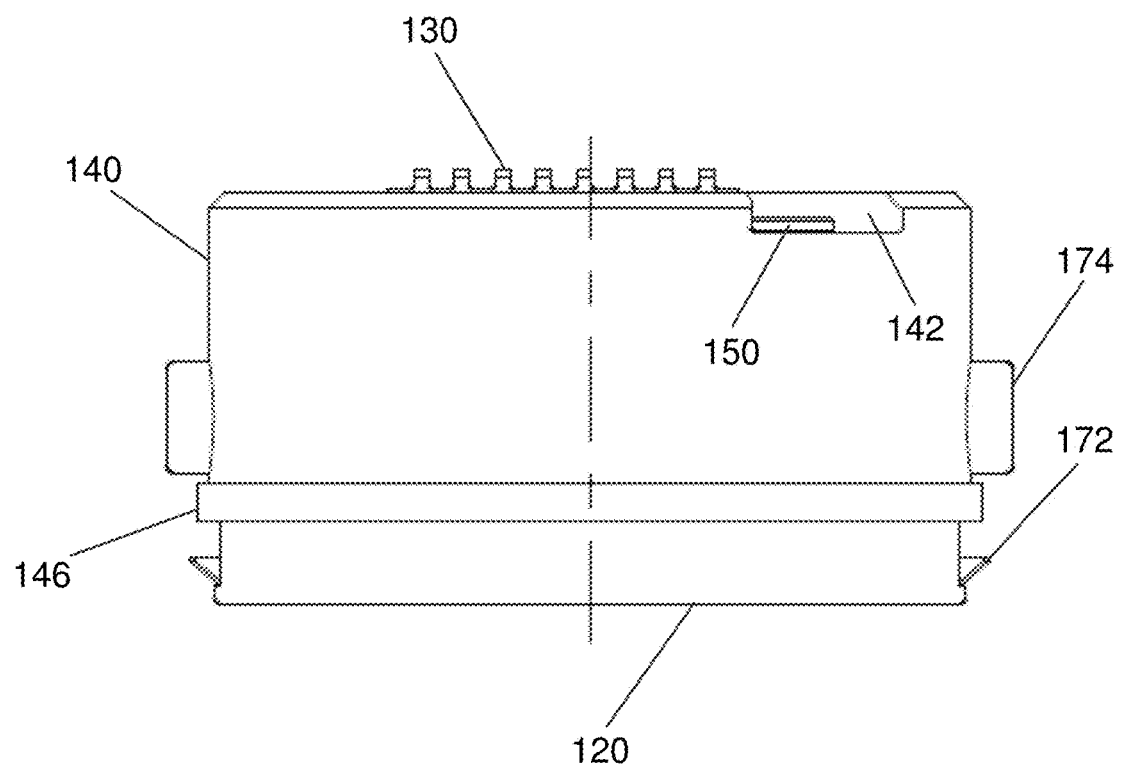
FIG. 2C is a side view illustrating the assembled x-ray battery adapter, according to an embodiment of the present invention.
Figure 2D:
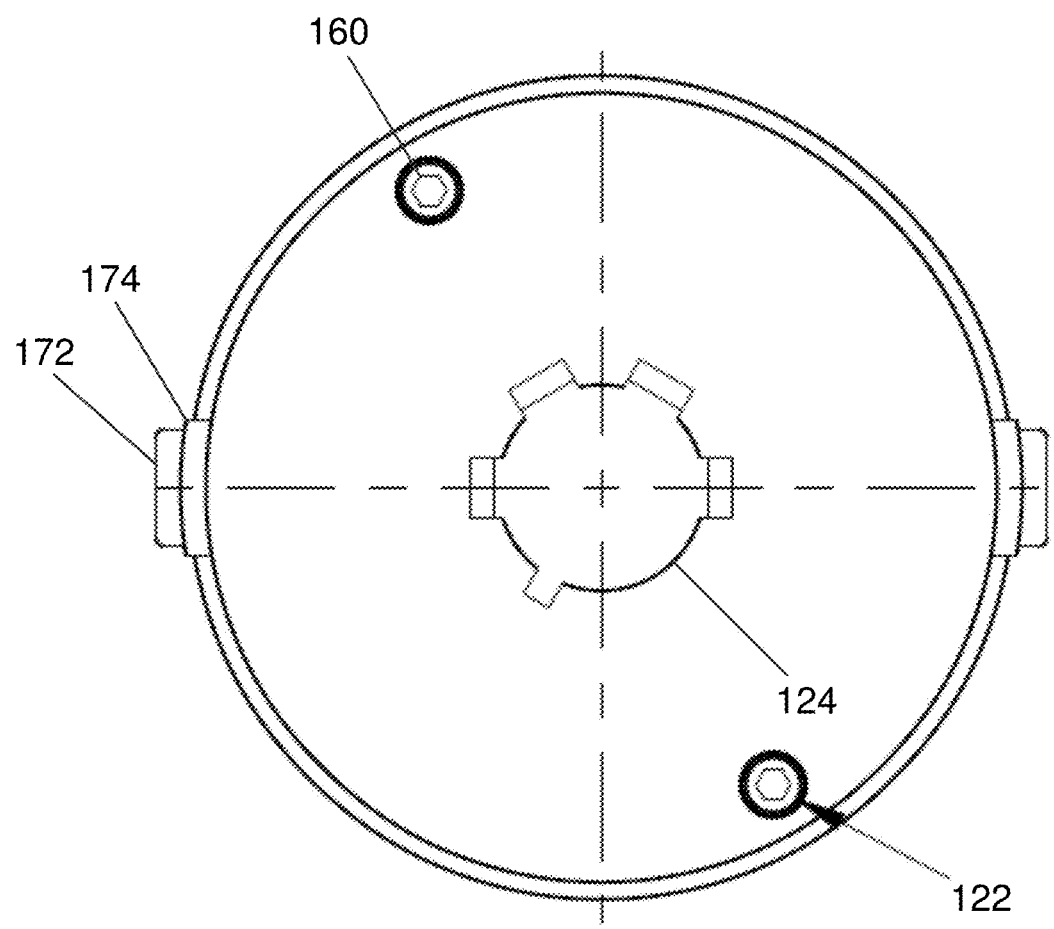
FIG. 2D is a bottom view illustrating the assembled x-ray battery adapter, according to an embodiment of the present invention.

FIGS. 2A-D perspective, top, side, and bottom views, respectively, of assembled x-ray battery adapter 100, according to an embodiment of the present invention. Throughout the figures, dashed lines indicate axes through the center of the depicted component. In FIGS. 2A-C, various external components of x-ray battery adapter 100 are visible, including baseplate 120, heat sink 130, and cover 140. Cover 140 includes a recess 142 for battery input 150 and a hole 144 for an over-temperature indicator light 118 (see FIG. 3B). Cover 140 also includes a molded flange 146.

Battery input 150 includes a clocking marking 152 showing the user the correct direction in which to insert a connector from the battery. Battery input 150 also includes a hole 154 to receive the connector from the battery. Wires (not shown) connect battery input 150 to circuit board 110. In some embodiments, battery input 150 may be configured to receive a 12-40V DC input. However, any desired voltage range may be used and implemented without deviating from the scope of the invention.

Figure 3A:
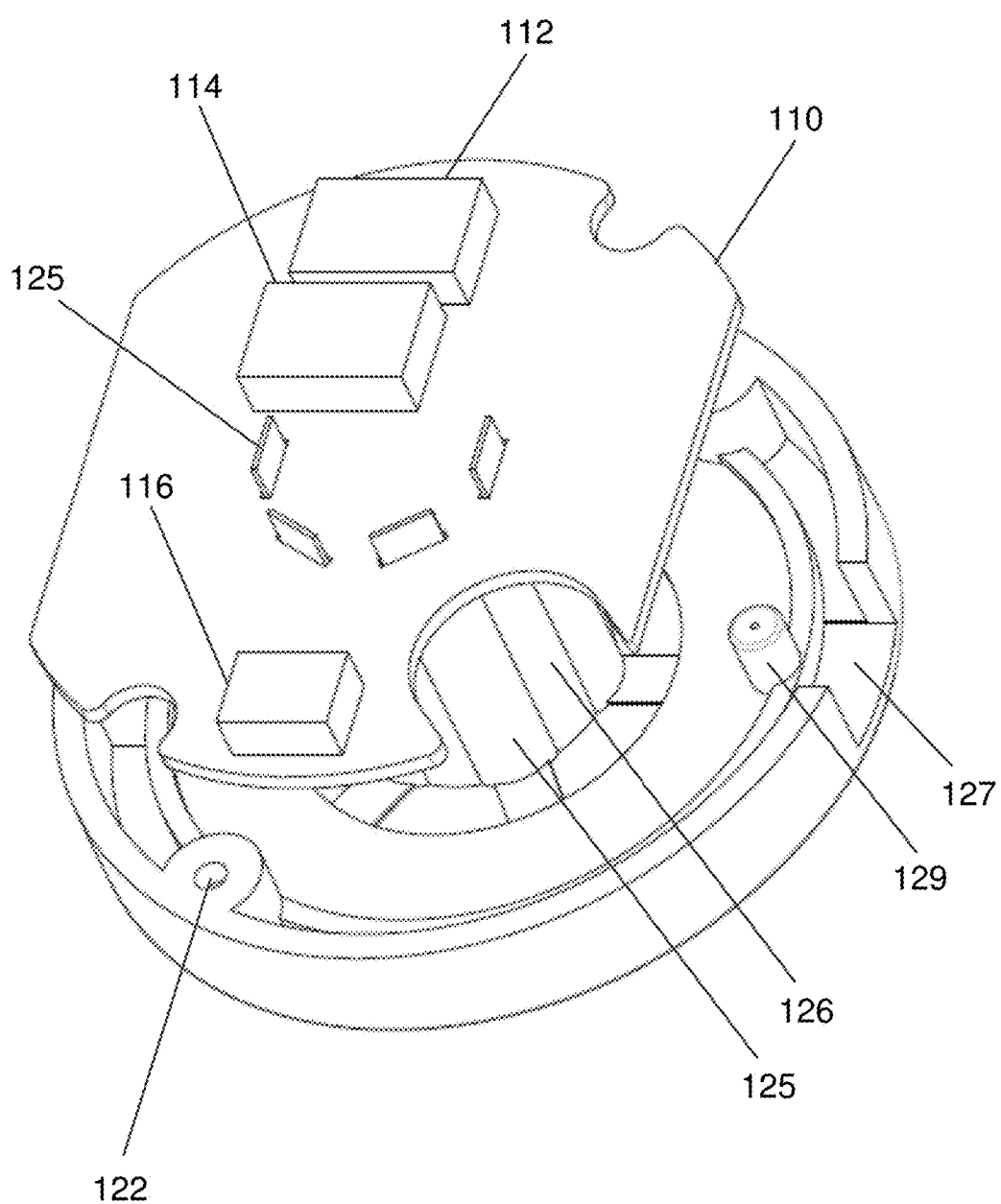
FIG. 3A is a perspective view illustrating a circuit board positioned on a baseplate to form a baseplate assembly of the x-ray battery adapter, according to an embodiment of the present invention.
Figure 4:
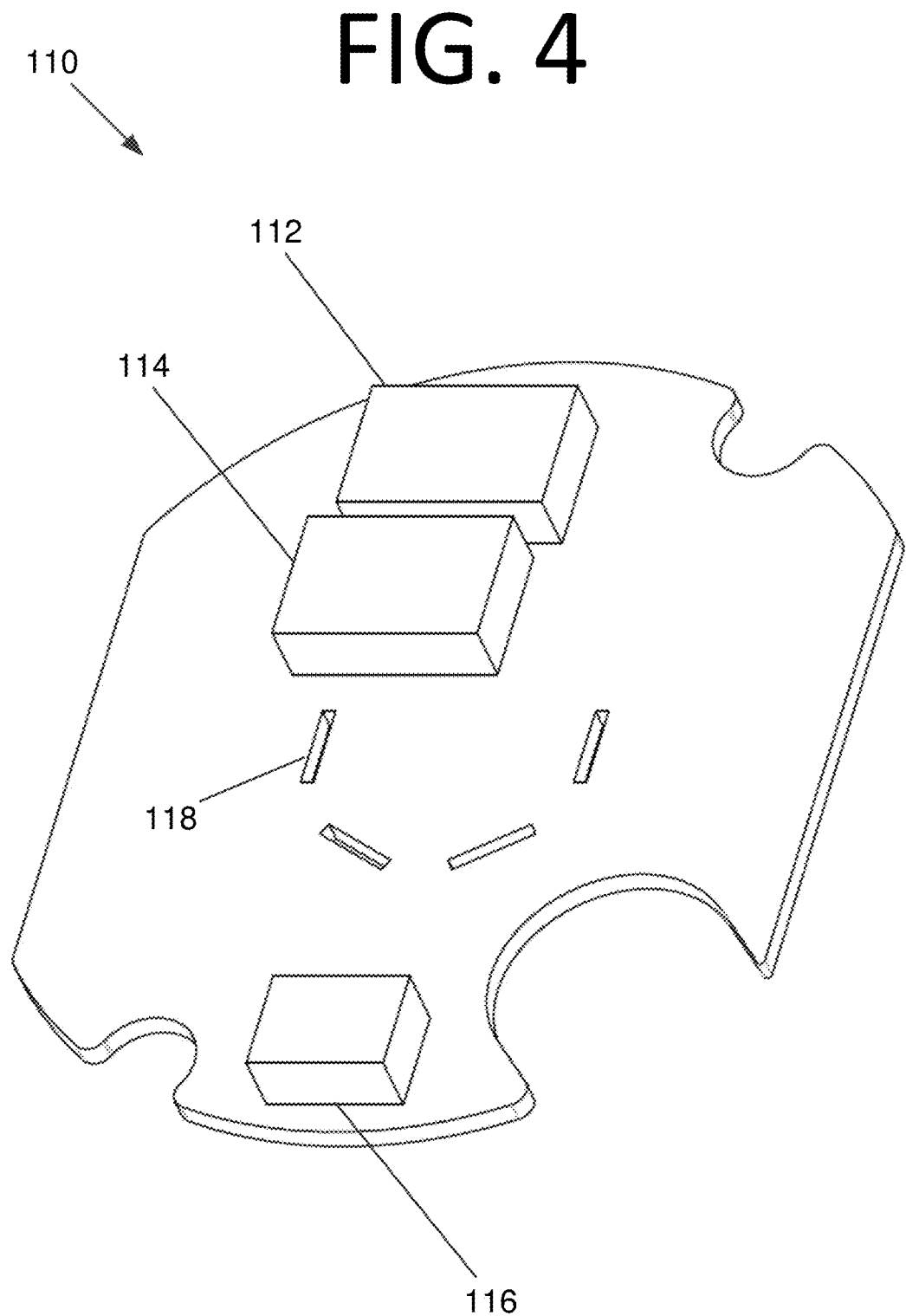
FIG. 4 is a perspective view illustrating the circuit board, according to an embodiment of the present invention.
Figure 5A:
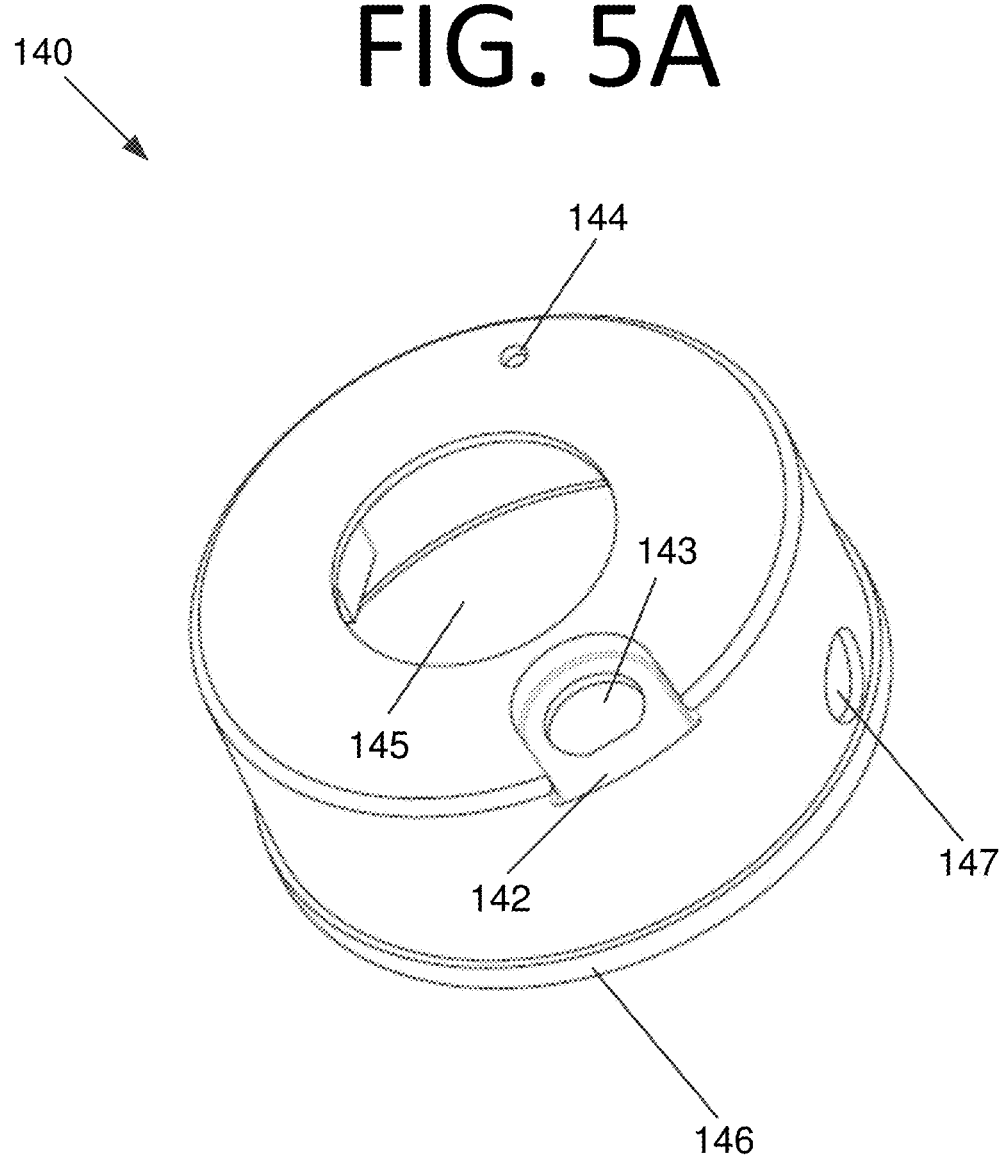
FIG. 5A is a top perspective view illustrating a cover, according to an embodiment of the present invention.
Figure 6:
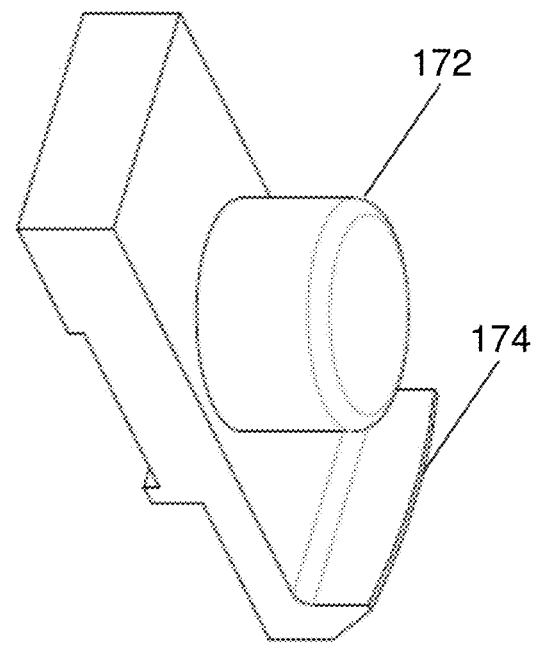
FIG. 6 is a perspective view illustrating a post, according to an embodiment of the present invention.

A release clip 170 (not shown here—see FIG. 6) includes a button 172 that extends through a hole (see hole 147 in FIGS. 5A and 5B) in cover 140 to release baseplate 120 from cover 140, and a push button/clip 174 that operates the release mechanism for x-ray battery adapter 100 and extends through a recess (see recess 127 in FIG. 3A) in baseplate 120 (see FIG. 6). Release clip 170 may be a solid machined part in some embodiments. In the bottom view presented in FIG. 2D, it can be seen that baseplate 120 includes holes 122 for screws 160. A connector 124 connects to an x-ray generating device (not shown). In some embodiments, connector 124 may output 8V DC at 15 amps (A). However, any desired voltage and amperage may be output based on the requirements of the x-ray generating device without deviating from the scope of the invention FIGS. 3A-C are perspective, top, and side views, respectively, illustrating circuit board 110 positioned on baseplate 120 to form a baseplate assembly of x-ray battery adapter 100, according to an embodiment of the present invention. Baseplate 120 includes screw holes 122 that accept the threaded portion of screws 160. Baseplate 120 also includes a circuit mount 126 that include spring posts 180 (see FIG. 8). Ends 182 of spring posts 180 are configured to pass through holes 118 in circuit board 110 (see FIG. 4). Base plate 120 also includes a molded standoff 129.

As illustrated in FIGS. 3A-C and 4, circuit board 110 includes power transistors Q1 112 and Q2 114 that are part of a DC-to-DC converted circuit. Control integrated circuit 116 controls the DC-to-DC converter circuit. In some embodiments, over-temperature indicator 118 may light up at 120° C. However, the temperature may vary based on the design of x-ray battery adapter 100.

FIGS. 5A and 5B are top and bottom perspective views, respectively, illustrating cover 140, according to an embodiment of the present invention. In addition to the features described above, cover 140 includes three holes 143, 145, 147. Hole 143 is configured to accept battery input 150, hole 145 is configured to allow heat sink 130 to protrude therethrough, and hole 147 is configured to allow button 172 to protrude therethrough.

FIG. 6 is a perspective view illustrating release clip 170, according to an embodiment of the present invention. In this embodiment, x-ray battery adapter 100 includes two release clips 170. However, in other embodiments, more release clips, fewer release clips, or no release clips at all may be included without deviating from the scope of the invention. Release clips 170 attach the entire subassembly to the x-ray generating device.

Figure 7:
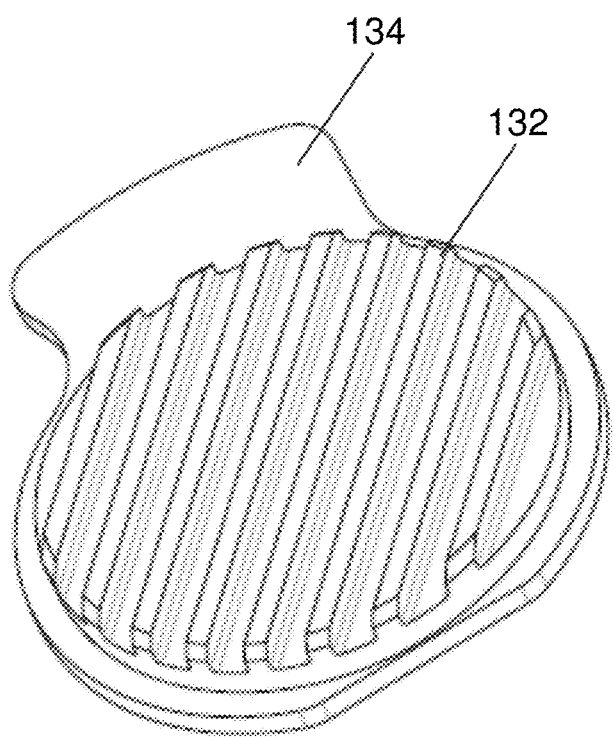
FIG. 7 is a top perspective view illustrating a heat sink, according to an embodiment of the present invention.

FIG. 7 is a top perspective view illustrating heat sink 130, according to an embodiment of the present invention. Heat sink 130 includes fins that increase the surface area of heat sink 130 to more effectively dissipate heat. Fins 132 extend through hole 145 in cover 140. Heat sink 130 also includes a tab 134 that maximizes contact with internal components that require cooling.

Figure 8:
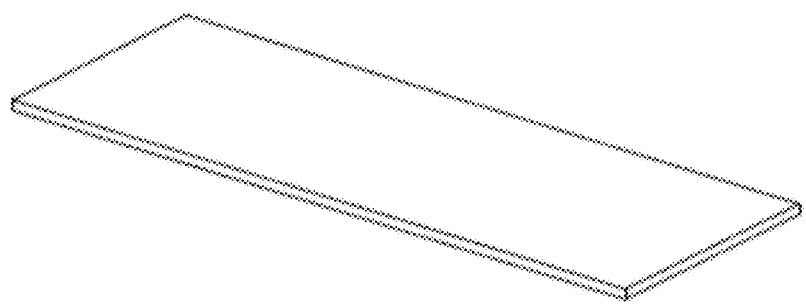
FIG. 8 is a perspective view illustrating a spring post, according to an embodiment of the present invention.

FIG. 8 is a perspective view illustrating a spring 180, according to an embodiment of the present invention. Spring 180 causes release clip 170 to return to the deployed position when the adapter subassembly is clipped to the x-ray generating device. This makes button 172 into a spring loaded release mechanism.

Figure 9B:
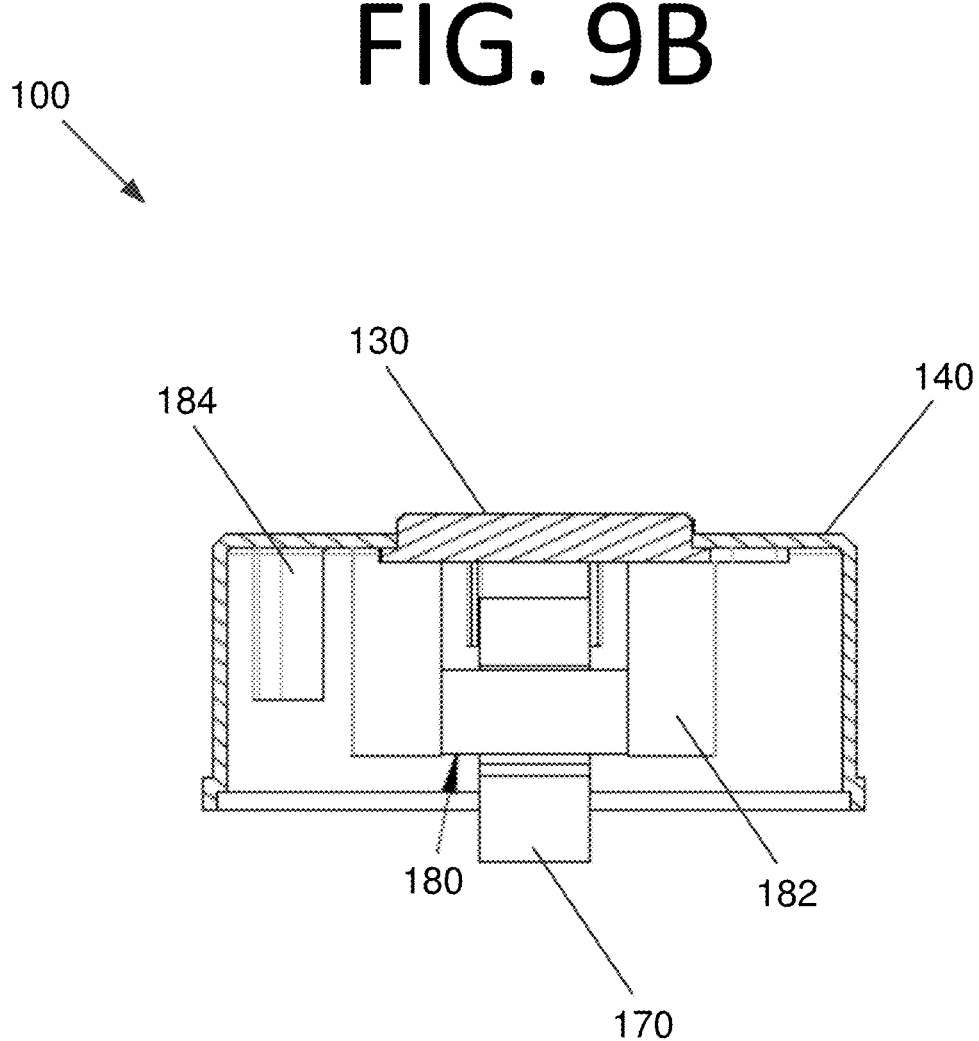
FIG. 9B is side a cutaway view parallel to the release clips illustrating a cover assembly of the x-ray battery adapter, according to an embodiment of the present invention.
Figure 10B:
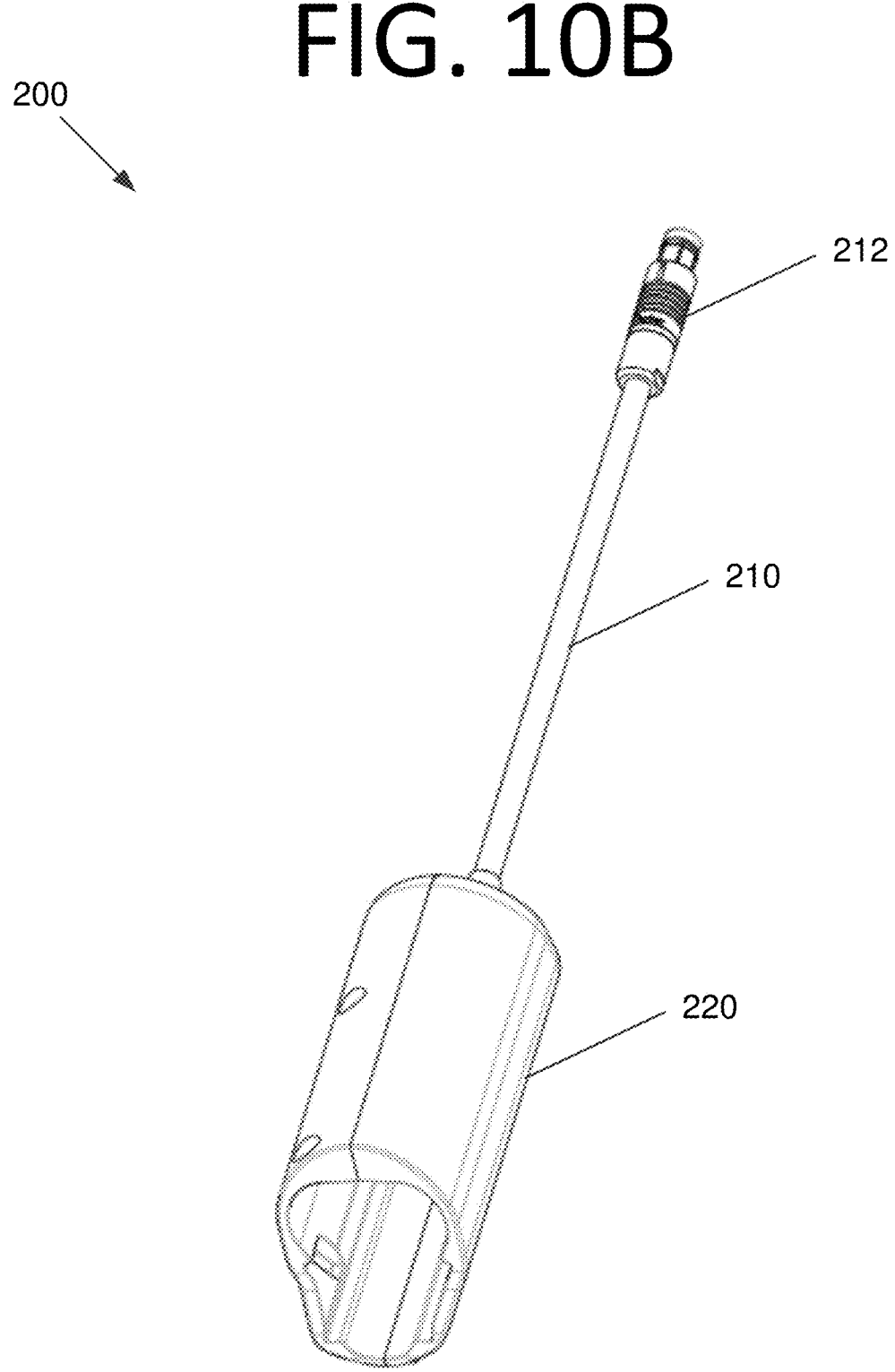
FIG. 10B is a perspective view illustrating an assembled geometry adapter, according to an embodiment of the present invention.
Figure 10D:
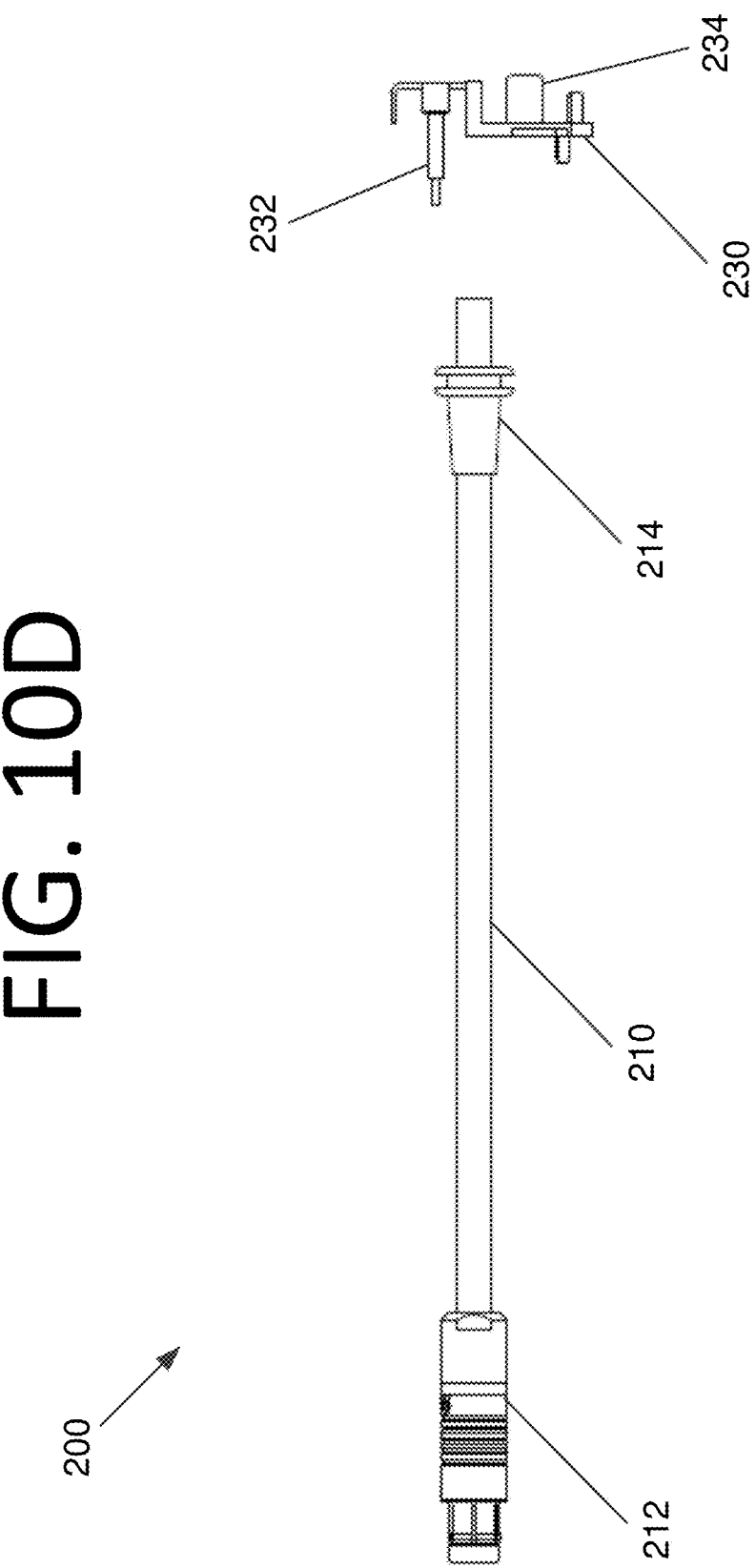
FIG. 10D is a side view illustrating the cable and the connector block of the geometry adapter, according to an embodiment of the present invention.

FIGS. 9A and 9B are side cutaway views illustrating a cover assembly of x-ray battery adapter 100, according to an embodiment of the present invention. A spring retainer 182 holds spring 180 in place. In some embodiments, spring retainer 182 may be part of an injection molded housing. A threaded screw boss 184 may be part of the injection molded housing in some embodiments.

FIGS. 10A-D illustrate a geometry adapter 200 and components thereof, according to an embodiment of the present invention. "Geometry adapter" refers to the housing intended to adapt to a battery. Geometry adapter 200 includes a cable 210, a battery receptacle 220, and a connector block 230. Battery receptacle 220 is shaped as a receptacle that houses the battery.

Cable 210 includes a plug 212 that is configured to connect to a battery input of an x-ray battery adapter, such as battery input 150. Alternatively, in the event that plug 212 is not compatible with the battery input of the x-ray battery adapter, plug 212 may connect to an adapter cable (not shown) that connects to plug 212 on one end and the battery input of the x-ray adapter on the other end. Cable 210 also includes a grommet sleeve 214 that is configured to connect to a voltage sensor and battery connector block assembly 230.

Battery receptacle 220 houses a battery (not shown), grommet sleeve 214, and voltage sensor and battery connector block assembly 230. Battery receptacle 220 includes a right half 222 and a left half 224. Right half 222 and left half 224 each include screw holes 226 to accept screws 228 and attach right half 222 and left half 224 together.

Voltage sensor and battery connector block assembly 230 operably connects cable 210 to the battery, as well as senses the voltage. Voltage sensor and battery connector block assembly 230 includes a battery connector 232 (e.g., a 12V connector) and a battery clip 234, which is metal contact that contacts the battery.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An x-ray battery adapter system, comprising:
an x-ray battery adapter;
a geometry adapter;
a circuit board; and
a baseplate comprising a connector that connects to an x-ray generating device, wherein
the baseplate comprises a circuit mount that is configured to hold the circuit board thereon, and
the circuit mount comprises a plurality of spring posts to hold the circuit board on the baseplate via respective holes in the circuit board.

2. The x-ray battery adapter system of claim 1, wherein the x-ray battery adapter is configured to accept battery power sources from 12-40V.

3. The x-ray battery adapter system of claim 1, wherein the x-ray battery adapter comprises a release clip that connects the x-ray battery adapter to an x-ray generating device.

4. The x-ray battery adapter system of claim 1, wherein the x-ray battery adapter comprises:

a heat sink;
a cover; and
a battery input.

5. The x-ray battery adapter system of claim 4, wherein the cover comprises a recess for the battery input and a hole for an over-temperature indicator light of the circuit board.

6. The x-ray battery adapter system of claim 4, wherein the cover comprises:
   a first hole configured to accept a battery input;
   a second hole configured to allow the heat sink to protrude therethrough; and
   a third hole configured to allow a button of a release clip to protrude therethrough.

7. The x-ray battery adapter system of claim 1, wherein the geometry adapter comprises:
   a cable;
   a battery receptacle configured to house a battery; and
   a voltage sensor and battery connector block assembly.

8. The x-ray battery adapter system of claim 7, wherein the x-ray battery adapter comprises a battery input, and the cable comprises a plug configured to connect to the battery input.

9. The x-ray battery adapter system of claim 7, wherein the cable comprises a grommet sleeve configured to connect to the voltage sensor and battery connector block assembly.

10. The x-ray battery adapter system of claim 7, wherein the voltage sensor and battery connector block assembly comprises a battery connector that connects to the battery.

11. The x-ray battery adapter system of claim 10, wherein the voltage sensor and battery connector block assembly are configured to detect when a voltage from the battery exceeds a predetermined limit.

12. An x-ray battery adapter, comprising:
   a circuit board;
   a baseplate comprising a connector that connects to an x-ray generating device;
   a heat sink;
   a cover, comprising:
      a first hole configured to accept a battery input,
      a second hole configured to allow the heat sink to protrude therethrough, and
      a third hole configured to allow a button of a release clip to protrude therethrough; and
   a battery input.

13. The x-ray battery adapter of claim 12, wherein the cover comprises a recess for the battery input and a hole for an over-temperature indicator light of the circuit board.

14. The x-ray battery adapter of claim 12, further comprising:
   a release clip that connects the cover to the baseplate.

15. The x-ray battery adapter of claim 14, wherein
   the baseplate comprises a circuit mount configured to hold the circuit board thereon, and
   the circuit mount comprises a plurality of spring posts to hold the circuit board on the baseplate via respective holes in the circuit board.

* * * * *